United States Patent [19]

Prucha

[11] 3,745,975
[45] July 17, 1973

[54] DISPOSABLE PET RELIEF STRUCTURE

[76] Inventor: Stephen J. Prucha, 1546 Millard, Madison Heights, Mich. 48071

[22] Filed: Sept. 21, 1971

[21] Appl. No.: 182,359

[52] U.S. Cl. ................................................. 119/1
[51] Int. Cl. ........................................... A01k 29/00
[58] Field of Search ...................... 119/1; 206/45.19

[56] References Cited
UNITED STATES PATENTS

| | | | |
|---|---|---|---|
| 2,741,223 | 4/1956 | Winborn, Jr. | 119/1 |
| 2,148,048 | 2/1939 | Gray | 206/45.19 UX |
| 2,671,427 | 3/1954 | Fell | 119/1 |
| 2,963,003 | 12/1960 | Oberg et al. | 119/1 |
| 3,233,588 | 2/1966 | Thomas | 119/1 |

Primary Examiner—Hugh R. Chamblee
Attorney—Dale R. Small

[57] ABSTRACT

A throwaway litter box for cats or the like comprising a generally rectangular container partly filled with absorbent granular material. The container includes thereon supports for spacing the bottom of the container from a surface on which it is positioned to prevent moisture condensation on the surface beneath the container, an inwardly extending flange at the open top of the container to minimize spilling of the granular material, and hand grips in the container to facilitate handling of the container. A cover is provided for the container to prevent shifting of the granular material in the container during shipping and storing of the container prior to use. The cover also serves as a pet dish tray when the pet relief structure is in use.

3 Claims, 3 Drawing Figures

PATENTED JUL 17 1973 3,745,975

INVENTOR.
STEPHEN J. PRUCHA
BY Whittemore
Hulbert & Belknap
ATTORNEYS

DISPOSABLE PET RELIEF STRUCTURE

BACKGROUND OF THE INVENTION

1. Field of the Invention

The invention relates to pet relief structure and refers more particularly to a litter box in which a pet cat or the like may relieve itself, which structure is disposable and which has features which inhibit throwing of material out of the structure by a pet, prevent condensation on the surface on which the pet relief structure is positioned, and facilitate movement of the structure.

2. Description of the Prior Art

In the past, pet relief structures have generally been improvised from, for example, cardboard boxes, metal pans and the like filled with sand, ground clay and similar material. These improvised pet relief structures have been objectionable in that they have an odor and require frequent cleaning. Cleaning of pet relief structures creates particularly objectionable odors and dust. In addition, with the improvised pet relief structures of the past, condensation at the bottom of pans or boxes resting directly on flat surfaces has also been objectionable.

Pet shops have recently sold ground clay in boxes or bags for use in such improvised pet relief structures. However, even with the best granular material the odor, dust and condensate problem is still present with known pet relief structures, particularly at cleaning time.

SUMMARY OF THE INVENTION

The invention is a pet relief structure including a separate container partly filled with absorbent granular material and a cover for the container.

The container is generally rectangular and has supports at the four corners thereof for spacing the bottom of the container from a surface on which it is set to prevent condensate from forming on the surface. The container further has hand grips to facilitate movement of the container, and a flange is provided around the open top of the container for inhibiting throwing of granular material out of the container by a pet.

The cover is adapted to fit over the container and to prevent shifting and spillage of granular material from the container during shipping and storage. The cover has a secondary use as a pet dish tray after it is removed from the container.

Since the container and the granular material within the container are completely disposable after a predetermined period of use as, for example, two weeks, there is no necessity of cleaning the granular material out of the container and subsequently washing the container, which at best is a messy, smelly chore. Further, the pet relief structure of the invention is immediately serviceable and may be so dimensioned as to provide the exact size for the particular pet so that it may be changed at exact intervals and without waste.

DESCRIPTION OF THE PREFERRED EMBODIMENT

Figure 1:
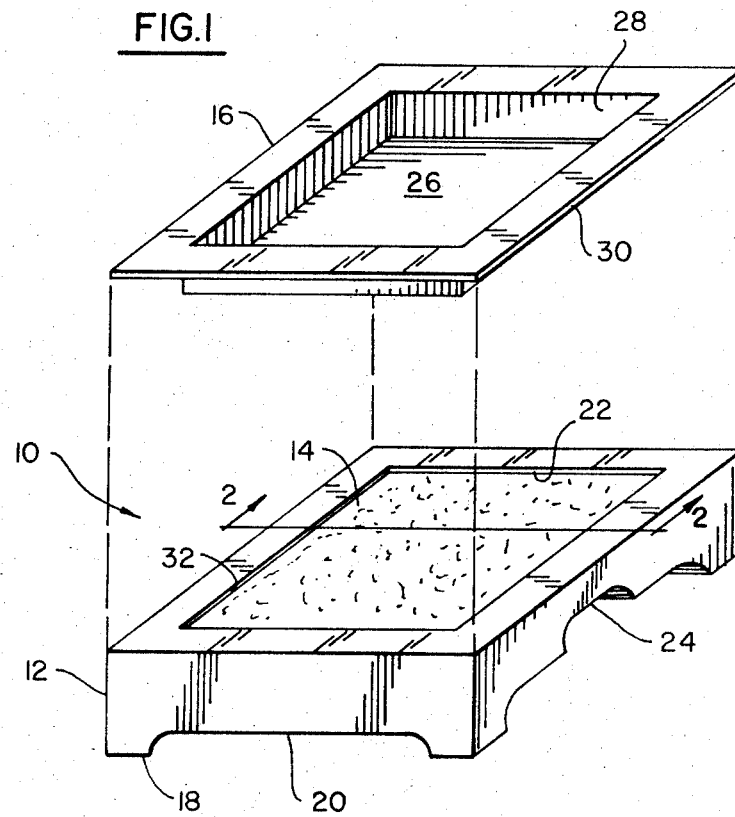
FIG. 1 is an exploded perspective view of the pet relief structure constructed in accordance with the invention.
Figure 2:
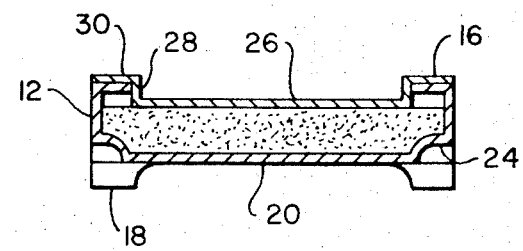
FIG. 2 is a transverse cross section of the pet relief structure illustrated in FIG. 1, taken substantially on the line 2—2 in FIG. 1.

As shown in the Figures, the pet relief structure 10 of the invention includes a container 12 partly filled with absorbent granular material 14 and a cover 16.

The container 12 as shown is generally rectangular and has the supports 18 at the four corners thereof for spacing the container bottom 20 from a surface on which the container 12 is set. Thus, condensate will not form on the surface on which the container 12 is set due to heat in the granular material 14 in the container 12 after use by a pet. The bottom 20 of the container 12 is ventilated by being placed in spaced relation to the surface on which the container is set.

The container 12 is further provided with a flange 22 extending inwardly of the open top thereof parallel to the container bottom 20. The flange 22 restricts throwing of granular material 14 out of container 20 by a pet digging in the granular material 14 prior to use of the pet relief structure. The flange 22 also inhibits spilling of the granular material 14 when the tray 12 is moved about to position it or dispose of it after it has been used for a predetermined period of time.

Hand grips 24 may also be provided on the container 12 to facilitate handling of the container. The hand grips 24 may be moulded into the container 12, as shown, or may be separately attached thereto.

The container 12 is preferably of plastic and is preferably blow moulded or vacuum formed. However, the type of material and the method of forming the container 12 is not critical, except insofar as the container should be constructed of a material and by a method which will economically permit disposability of the container after the granular material is fully used.

The granular material 14 may be No. 15 ground clay, in which case the container may be approximately 16 inches square and six inches deep overall to permit a ground clay depth of at least a full three inches, a space between the top of the granular material and flange of two and one-half inches and container supports 18 of one-half inch. Such a container and ground clay material 14 will be serviceable for an average cat for approximately two weeks. Other granular material or mixtures may be used as desired. The requirement for the granular material 14 is that it absorb liquid and reduce odor to a minimum.

The cover 16 is again rectangular and has a closed bottom 26 and an open top 28. An outwardly extending flange 30 is provided on the cover 16 at the open top 28 thereof. The cover 16 is such that it will fit snugly in the opening 32 provided by the flange 22 on the container 12. The cover 16 thus keeps the granular material 14 in the container 12 from shifting in shipment and storage. The flange 30, which is in surface to surface contact with the flange 22, permits ready removal of the cover 16 from the container 12 when the pet relief structure is first used.

Figure 3:
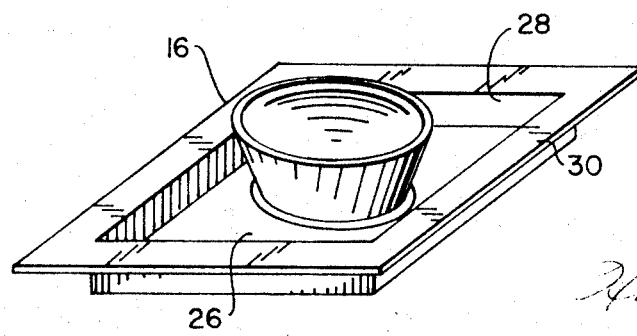
FIG. 3 is a perspective view of the cover of the pet relief structure illustrated in FIG. 1, shown in its alternate use as a pet dish tray.

During use of the pet relief structure 10, the cover 16 may be used as a tray for the pet's dish, as illustrated in FIG. 3. When it is time to dispose of the pet relief structure 12, the cover 16 may be replaced on the container 12 and the container, granular material 14 and cover 16 may be disposed of together.

Thus, the dusty, smelly job of cleaning a pet relief box is done away with with the disposable pet relief structure 10, since no cleaning of the container 12 is contemplated. Further, moisture spots on the surfaces on which the pet relief structure is placed are eliminated due to the air space provided between the bottom of the container 12 and a surface on which it is positioned. In addition, the specially constructed container 12 is readily handled by means of the hand grips, and since it may be exactly proportioned for the usual pet, waste of granular material is maintained at a minimum. It will be further noted that the pet relief structure 10 is immediately useable on purchase, whereas individual boxes and granular material purchased separately must be placed together after cleaning of the usual container.

It is contemplated that an exterior shipping container will be utilized in conjunction with the pet relief structure 10 including the container 12 and cover 16, which will maintain the cover on the container 12, and that different size pet relief structures will be provided.

While one embodiment of the invention has been considered in detail, it will be understood that other embodiments and modifications thereof are contemplated by the inventor. For example, the container 12 could be a separate article of commerce for use in place of the cardboard boxes and metal pans which are presently used for holding granular material for pet relief purposes. The containers 12 would have the advantages of bottom ventilation, restriction of spillage due to the flange 22, and facility of movement by the hand grips. Further, it will be understood that the containers may be of any desired shape such as round, polygonal or the like. It is therefore the intention to include all such structures and modifications thereof as are defined by the appended claims within the scope of the invention.

What I claim as my invention is:

1. Disposable pet relief structure comprising a rigid rectangular container having a bottom and four sides, absorbent granular material only partly filling the container, a continuous flange extending inwardly from the top of the four sides of the container extending over a portion of the granular material in the container at the sides of the container and in spaced relation to the absorbent material whereby the absorbent material is maintained in the container on shifting of the container or the absorbent material, and supports at the bottom of the container for spacing the bottom of the container from a surface on which the container is positioned to permit ventilation between the bottom of the container and the surface whereby moisture condensation between the bottom of the container and the surface on which the container is positioned is prevented, and a cover positioned over the open top of the container and extending into the container for preventing shifting of the granular material within the container and for closing the top of the container for shipping and display.

2. Structure as set forth in claim 1, wherein the container is rectangular, the cover has an outer rectangular dimension corresponding to the outer rectangular dimension of the container and the cover is provided with a depressed central portion fitting snugly within the flanges of the container in engagement with the absorbent material in the container.

3. Structure as set forth in claim 1, wherein the container is a single plastic member and hand grips are provided extending into the bottom and sides thereof on opposite sides of the container which are integral with the container for facilitating movement of the container.

* * * * *